US012637961B2

(12) United States Patent
Spruce

(10) Patent No.: US 12,637,961 B2
(45) Date of Patent: *May 26, 2026

(54) GEARBOXES FOR AIRCRAFT GAS TURBINE ENGINES

(71) Applicant: ROLLS-ROYCE plc, London (GB)

(72) Inventor: Mark Spruce, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 19/185,704

(22) Filed: Apr. 22, 2025

(65) Prior Publication Data

US 2025/0250912 A1     Aug. 7, 2025

Related U.S. Application Data

(63) Continuation of application No. 18/588,409, filed on Feb. 27, 2024, now Pat. No. 12,297,745, which is a continuation of application No. 18/219,967, filed on Jul. 10, 2023, now Pat. No. 11,946,382, which is a continuation of application No. 17/863,836, filed on Jul. 13, 2022, now Pat. No. 11,739,660, which is a (Continued)

(30) Foreign Application Priority Data

Apr. 6, 2020     (GB) ...................................... 2005025

(51) Int. Cl.
| | |
|---|---|
| *F01D 25/18* | (2006.01) |
| *F01D 25/16* | (2006.01) |
| *F02C 3/113* | (2006.01) |
| *F02C 7/06* | (2006.01) |
| *F02C 7/36* | (2006.01) |
| *F02K 3/06* | (2006.01) |
| *F16H 57/04* | (2010.01) |
| *F16H 57/08* | (2006.01) |

(52) U.S. Cl.
CPC .......... *F01D 25/18* (2013.01); *F01D 25/166* (2013.01); *F02C 3/113* (2013.01); *F02C 7/06* (2013.01); *F02C 7/36* (2013.01); *F02K 3/06* (2013.01); *F16H 57/0469* (2013.01); *F16H 57/0479* (2013.01); *F05D 2220/323* (2013.01); *F05D 2220/36* (2013.01); *F05D 2260/40311* (2013.01); *F16H 2057/085* (2013.01)

(58) Field of Classification Search
CPC .. F01D 25/166; F02C 7/06; F02C 7/36; F02K 3/06; F05D 2220/323; F16H 57/0469; F16H 57/0479
See application file for complete search history.

(56) References Cited

U.S. PATENT DOCUMENTS 11,592,103 B2 * 2/2023 Simard-Bergeron ........................
     F16H 57/082
11,781,488 B2 * 10/2023 Spruce .................. F16H 57/082
     475/331

* cited by examiner

*Primary Examiner* — Huan Le
(74) *Attorney, Agent, or Firm* — Oliff PLC

(57) ABSTRACT

Gearboxes for aircraft gas turbine engines, in particular to arrangements for journal bearings such gearboxes, and to related methods of operating such gearboxes and gas turbine engines. Example embodiments include a gearbox for an aircraft gas turbine engine, the gearbox including: a sun gear; a plurality of planet gears surrounding and engaged with the sun gear; and a ring gear surrounding and engaged with the plurality of planet gears, each of the plurality of planet gears being rotatably mounted around a pin of a planet gear carrier with a journal bearing having an internal sliding surface on the planet gear and an external sliding surface on the pin.

20 Claims, 8 Drawing Sheets

Related U.S. Application Data continuation of application No. 17/205,870, filed on Mar. 18, 2021, now Pat. No. 11,421,552, which is a continuation of application No. 16/990,302, filed on Aug. 11, 2020, now Pat. No. 10,982,563.

GEARBOXES FOR AIRCRAFT GAS TURBINE ENGINES

This is a Continuation of application Ser. No. 18/588,409 filed Feb. 27, 2024, which in turn is a Continuation of application Ser. No. 18/219,967 filed Jul. 10, 2023, which in turn is a Continuation of application Ser. No. 17/863,836 filed Jul. 13, 2022, which in turn is a Continuation of application Ser. No. 17/205,870 filed Mar. 18, 2021, which in turn is a Continuation of application Ser. No. 16/990,302 filed Aug. 11, 2020, which in turn claims priority to British Application No. 2005025.8 filed Apr. 6, 2020. The entire disclosures of the prior applications are hereby incorporated by reference herein their entirety.

The present disclosure relates to gearboxes for aircraft gas turbine engines, in particular to arrangements for journal bearings in such gearboxes, and to related methods of operating such gearboxes and gas turbine engines.

Gas turbine engines with larger diameter fans may incorporate a gearbox connecting the fan to a core shaft of the engine core. An advantage of doing so is that both the fan and the engine core can be designed to operate efficiently as the fan size is scaled up, since the rotational speed of the fan is limited by the tangential speed of the fan tips. The gearbox allows for a reduction in rotational speed of the fan compared to that of the engine core, at the expense of additional weight of the gearbox and some efficiency losses within the gearbox. To maintain efficiency of operation of the engine, the gearbox needs to be designed to minimise weight and maximise efficiency. Bearings are a source of losses within a gearbox, and therefore need to be optimised to seek to maximise the efficiency of the gearbox.

According to a first aspect there is provided a gearbox for an aircraft gas turbine engine, the gearbox comprising:
- a sun gear;
- a plurality of planet gears surrounding and engaged with the sun gear; and
- a ring gear surrounding and engaged with the plurality of planet gears, each of the plurality of planet gears being rotatably mounted around a pin of a planet gear carrier with a journal bearing having an internal sliding surface on the planet gear and an external sliding surface on the pin,
- wherein the internal or external sliding surface of the journal bearing has a surface coating comprising a layer of an alloy having aluminium or copper as a primary constituent.

The ring gear may have a pitch circle diameter of around 550 mm or greater.

Each of the planetary bearings may have a maximum operating specific load and a maximum operating sliding speed, wherein the maximum operating specific load multiplied by the maximum operating sliding speed is around 240 MPa m/s or greater. The maximum operating sliding speed may be around 30 m/s or greater, and optionally no greater than around 60 m/s. The maximum operating specific load may be around 7 MPa or greater.

The maximum operating specific load multiplied by the maximum operating sliding speed may be less than around 720 MPa m/s.

The surface coating may be provided on the external sliding surface of each journal bearing.

The external sliding surface of each journal bearing may be on a sleeve mounted around a respective pin.

A thickness of the surface coating may be between around 40 and around 200 micrometres.

A thickness of the layer may be between around 40 and around 100 micrometres.

A gas turbine engine for an aircraft may comprise: an engine core comprising a turbine, a compressor and a core shaft connecting the turbine to the compressor; a fan located upstream of the engine core, the fan comprising a plurality of blades; and a gearbox according to the first aspect, the gearbox configured to receive an input from the core shaft and provide an output drive to the fan so as to drive the fan at a lower rotational speed than the core shaft.

Where the turbine is a first turbine, the compressor is a first compressor, and the core shaft is a first core shaft, the engine core may further comprise a second turbine, a second compressor, and a second core shaft connecting the second turbine to the second compressor, the second turbine, second compressor, and second core shaft being arranged to rotate at a higher rotational speed than the first core shaft.

According to a second aspect there is provided a method of operating the gas turbine engine, the method comprising operating the engine at maximum take-off conditions, wherein for each journal bearing in the gearbox a specific loading multiplied by a sliding speed is greater than around 240 MPa m/s.

The specific loading multiplied by a sliding speed for each journal bearing may be less than around 720 MPa m/s.

According to a third aspect there is provided a gearbox for an aircraft gas turbine engine, the gearbox comprising:
- a sun gear;
- a plurality of planet gears surrounding and engaged with the sun gear; and
- a ring gear surrounding and engaged with the plurality of planet gears, each of the plurality of planet gears beings rotatably mounted around a pin of a planet gear carrier with a journal bearing having an internal sliding surface on the planet gear and an external sliding surface on the pin,
- wherein a ratio of a length, L, of the internal and external sliding surfaces to a diameter, D, of the journal bearing is between around 0.5 and 1.4.

The ring gear may have a pitch circle diameter of around 550 mm or greater.

The L/D ratio in some examples may be between around 1.1 and 1.3.

Each of the planetary bearings may have a maximum operating specific load and a maximum operating sliding speed, wherein the maximum operating specific load multiplied by the maximum operating sliding speed is around 240 MPa m/s or greater.

The maximum operating specific load multiplied by the maximum operating sliding speed may be less than around 720 MPa m/s.

The pitch circle diameter of the ring gear may be no greater than 1200 mm.

A gas turbine engine for an aircraft may comprise: an engine core comprising a turbine, a compressor and a core shaft connecting the turbine to the compressor; a fan located upstream of the engine core, the fan comprising a plurality of blades; and a gearbox according to the third aspect, the gearbox configured to receive an input from the core shaft and provide an output drive to the fan so as to drive the fan at a lower rotational speed than the core shaft.

Where the turbine is a first turbine, the compressor is a first compressor, and the core shaft is a first core shaft, the engine core may further comprise a second turbine, a second compressor, and a second core shaft connecting the second turbine to the second compressor, the second turbine, second compressor, and second core shaft being arranged to rotate at a higher rotational speed than the first core shaft.

According to a fourth aspect there is provided a method of operating the gas turbine engine, the method comprising operating the engine at maximum take-off conditions, wherein for each journal bearing in the gearbox a specific loading multiplied by a sliding speed is greater than around 240 MPa m/s.

The specific loading multiplied by a sliding speed for each journal bearing may be less than around 720 MPa m/s.

According to a fifth aspect there is provided a method of operating a gearbox for an aircraft gas turbine engine, the gearbox comprising:

a sun gear;

a plurality of planet gears surrounding and engaged with the sun gear; and a ring gear surrounding and engaged with the plurality of planet gears, the ring gear having a pitch circle diameter of around 550 mm or greater, wherein each of the plurality of planet gears is rotatably mounted around a pin of a planet gear carrier with a journal bearing having an internal sliding surface on the planet gear and an external sliding surface on the pin, an oil film between the internal surface on the planet gear and the external sliding surface on the pin varying between a maximum thickness and a minimum thickness around the journal bearing, the method comprising operating the aircraft gas turbine engine at maximum take-off conditions such that the minimum thickness of the oil film varies between the plurality of planet gears by no more than 8% from a mean minimum oil film thickness.

A diameter, D, of each journal bearing may be between around 120 mm and around 200 mm.

A length, L, of the internal and external sliding surfaces of each journal bearing may be between around 0.5 and around 1.4 of the diameter, D. The ratio L/D may be between around 1.1 and around 1.3.

The mean minimum oil film thickness at maximum take-off conditions may be between around 3.5 and 8 micrometres.

An eccentricity ratio of each journal bearing during operation of the gas turbine engine at maximum take-off conditions may be within a range of between around 0.94 and 0.97.

For each journal bearing in the gearbox a specific loading multiplied by a sliding speed may be greater than around 240 MPa m/s.

The specific loading multiplied by a sliding speed for each journal bearing may be less than around 720 MPa m/s.

According to a sixth aspect there is provided a gearbox for an aircraft gas turbine engine, the gearbox comprising:

a sun gear;

a plurality of planet gears surrounding and engaged with the sun gear; and a ring gear surrounding and engaged with the plurality of planet gears, each of the plurality of planet gears being rotatably mounted around a pin of a planet gear carrier with a journal bearing having an internal sliding surface on the planet gear and an external sliding surface on the pin, an oil film between the internal surface on the planet gear and the external sliding surface on the pin varying between a maximum thickness and a minimum thickness around the journal bearing, and wherein, during operation of the aircraft gas turbine engine at maximum take-off conditions, the minimum thickness of the oil film varies between the plurality of planet gears by no more than 8% from a mean minimum oil film thickness.

The various optional features mentioned above in relation to the fifth aspect may apply also to the sixth aspect.

A gas turbine engine for an aircraft may comprise: an engine core comprising a turbine, a compressor and a core shaft connecting the turbine to the compressor; a fan located upstream of the engine core, the fan comprising a plurality of blades; and a gearbox according to the sixth aspect, the gearbox configured to receive an input from the core shaft and provide an output drive to the fan so as to drive the fan at a lower rotational speed than the core shaft.

Where the turbine is a first turbine, the compressor is a first compressor, and the core shaft is a first core shaft, the engine core may further comprise a second turbine, a second compressor, and a second core shaft connecting the second turbine to the second compressor, the second turbine, second compressor, and second core shaft being arranged to rotate at a higher rotational speed than the first core shaft.

According to a seventh aspect there is provided a gearbox for an aircraft gas turbine engine, the gearbox comprising:

a sun gear;

a plurality of planet gears surrounding and engaged with the sun gear; and a ring gear surrounding and engaged with the plurality of planet gears, each of the plurality of planet gears being rotatably mounted around a pin of a planet gear carrier with a journal bearing having an internal sliding surface on the planet gear and an external sliding surface on the pin, wherein, during operation of the aircraft gas turbine engine at maximum take-off conditions, a specific operating load multiplied by an operating sliding speed of each journal bearing is around 300 MPa m/s or greater.

The ring gear may have a pitch circle diameter of around 550 mm or greater.

During operation of the aircraft gas turbine engine at maximum take-off conditions, the specific operating load multiplied by the operating sliding speed of each journal bearing may be no greater than around 720 MPa m/s.

During operation of the aircraft gas turbine engine at maximum take-off conditions, the sliding speed of each journal bearing may be greater than around 30 m/s or 35 m/s.

During operation of the aircraft gas turbine engine at maximum take-off conditions, the sliding speed of each journal bearing may be less than around 49 m/s, 47 m/s, 43 m/s or 40 m/s.

During operation of the aircraft gas turbine engine at maximum take-off conditions, the specific operating load of each journal bearing may be around 5 MPa or greater.

During operation of the aircraft gas turbine engine at maximum take-off conditions, the specific operating load of each journal bearing may be less than around 20 MPa.

During operation of the aircraft gas turbine engine at maximum take-off conditions, the specific operating load of each journal bearing may be greater than around 10 MPa.

A diametral clearance of each journal bearing may be between around 1‰ and around 2‰. The diametral clearance may be between around 1.4‰ and around 1.6‰.

A gas turbine engine for an aircraft may comprise:

an engine core comprising a turbine, a compressor, and a core shaft connecting the turbine to the compressor;

a fan located upstream of the engine core, the fan comprising a plurality of fan blades; and a gearbox according to the seventh aspect, the gearbox configured to receive an input from the core shaft and provide an output drive to the fan so as to drive the fan at a lower rotational speed than the core shaft.

Where the turbine is a first turbine, the compressor is a first compressor, and the core shaft is a first core shaft, the engine core may further comprise a second turbine, a second compressor, and a second core shaft connecting the second turbine to the second compressor, the second turbine, second compressor, and second core shaft being arranged to rotate at a higher rotational speed than the first core shaft.

According to an eighth aspect there is provided a method of operating the aircraft gas turbine engine, the method comprising operating the aircraft gas turbine engine at maximum take-off conditions such that a specific operating load multiplied by an operating sliding speed of each journal bearing is around 300 MPa m/s or greater.

The various optional features relating to the seventh aspect may also apply to the eighth aspect.

According to a ninth aspect, there is provided a gearbox for an aircraft gas turbine engine, the gearbox comprising:

a sun gear;

a plurality of planet gears surrounding and engaged with the sun gear; and a ring gear surrounding and engaged with the plurality of planet gears, each of the plurality of planet gears being rotatably mounted around a pin of a planet gear carrier with a journal bearing having an internal sliding surface on the planet gear and an external sliding surface on the pin, wherein, with the aircraft gas turbine engine operating at maximum take-off conditions, an eccentricity ratio of each journal bearing, defined as $1-2H_{min}/c$ where $H_{min}$ is a minimum oil film thickness between the internal and external sliding surfaces and c is the diametral clearance of the journal bearing, is greater than around 0.84.

The ring gear may have a pitch circle diameter of around 550 mm or greater.

With the aircraft gas turbine engine operating at maximum take-off conditions, the eccentricity ratio of each journal bearing may be between around 0.94 and 0.97.

The diametral clearance of each journal bearing may be between around 1‰ and around 2‰. In some examples the diametral clearance of each journal bearing may be between around 1.4‰ and 1.6‰.

With the aircraft gas turbine engine operating at maximum take-off conditions, a temperature of oil flowing into each journal bearing may be no greater than around 100° C.

With the aircraft gas turbine engine operating at maximum take-off conditions, a pressure of oil flowing into each journal bearing may be within a range from around 50 kPa to around 350 kPa.

An inefficiency of each journal bearing, defined as a percentage power loss with the aircraft gas turbine engine operating at maximum take-off conditions, may be less than around 0.225%. In some examples the inefficiency of each journal bearing may be no less than around 0.1%.

A gas turbine engine for an aircraft may comprise:

an engine core comprising a turbine, a compressor, and a core shaft connecting the turbine to the compressor;

a fan located upstream of the engine core, the fan comprising a plurality of fan blades; and a gearbox according to the ninth aspect, the gearbox configured to receive an input from the core shaft and provide an output drive to the fan so as to drive the fan at a lower rotational speed than the core shaft.

Where the turbine is a first turbine, the compressor is a first compressor, and the core shaft is a first core shaft, the engine core may further comprise a second turbine, a second compressor, and a second core shaft connecting the second turbine to the second compressor, the second turbine, second compressor, and second core shaft being arranged to rotate at a higher rotational speed than the first core shaft.

According to a tenth aspect there is provided a method of operating the gas turbine engine, the method comprising operating the aircraft gas turbine engine at maximum take-off conditions such that an eccentricity ratio of each journal bearing, defined as $1-2H_{min}/c$ where $H_{min}$ is a minimum oil film thickness between the internal and external sliding surfaces and c is the diametral clearance of the journal bearing, may be greater than around 0.84.

According to an eleventh aspect there is provided a gearbox for an aircraft gas turbine engine, the gearbox comprising:

a sun gear;

a plurality of planet gears surrounding and engaged with the sun gear; and a ring gear surrounding and engaged with the plurality of planet gears, each of the plurality of planet gears being rotatably mounted around a pin of a planet gear carrier with a journal bearing having an internal sliding surface on the planet gear and an external sliding surface on the pin, each journal bearing comprising an oil flow path passing through the journal bearing from an inlet to an outlet, wherein, with the aircraft gas turbine engine operating at maximum take-off conditions, a temperature of oil passing through each oil flow path increases by between 15 and 30° C. from the inlet to the outlet and a temperature of the oil at the inlet is less than 105° C.

The ring gear may have a pitch circle diameter of around 550 mm or greater.

With the aircraft gas turbine engine operating at maximum take-off conditions, the temperature of oil passing through each oil flow path may increase by between 15 and 25° C., or between 15 and 20° C., from the inlet to the outlet.

With the aircraft gas turbine engine operating at maximum take-off conditions, a specific oil flow rate through each oil flow path, defined as a flow rate of oil through the oil flow path divided by a diameter and length of the respective journal bearing may be less than around 2000 l min$^{-1}$ m$^{-2}$.

In some examples the gearbox may be a planetary gearbox, i.e. where the ring gear is connected to an output shaft and the sun gear connected to an input shaft.

With the aircraft gas turbine engine operating at maximum take-off conditions, a specific oil flow rate through each oil flow path, defined as a flow rate of oil through the oil flow path divided by a diameter and length of the respective journal bearing may be less than around 1000 l min$^{-1}$ m$^{-2}$.

In some examples the gearbox may be a star gearbox, i.e. where an output shaft is connected to a planet carrier connected to each planet gear and an input shaft is connected to the sun gear.

With the aircraft gas turbine engine operating at maximum take-off conditions, the specific oil flow rate through each oil flow path may be greater than around 400 l min$^{-1}$ m$^{-2}$.

With the aircraft gas turbine engine operating at maximum take-off conditions, a specific operating load multiplied by an operating sliding speed of each journal bearing may be around 250 MPa m/s or greater.

With the aircraft gas turbine engine operating at maximum take-off conditions, the specific operating load multiplied by the operating sliding speed of each journal bearing may be up to around 450 MPa m/s.

With the aircraft gas turbine engine operating at maximum take-off conditions, a specific operating load multiplied by an operating sliding speed of each journal bearing may be around 450 MPa m/s or greater.

With the aircraft gas turbine engine operating at maximum take-off conditions, the specific operating load multiplied by the operating sliding speed of each journal bearing may be up to around 720 MPa m/s.

A gas turbine engine for an aircraft may comprise:

an engine core comprising a turbine, a compressor, and a core shaft connecting the turbine to the compressor;

a fan located upstream of the engine core, the fan comprising a plurality of fan blades; and a gearbox according to the eleventh aspect, the gearbox configured to receive an input from the core shaft and provide an output drive to the fan so as to drive the fan at a lower rotational speed than the core shaft.

Where the turbine is a first turbine, the compressor is a first compressor, and the core shaft is a first core shaft, the engine core may further comprise a second turbine, a second compressor, and a second core shaft connecting the second turbine to the second compressor, the second turbine, second compressor, and second core shaft being arranged to rotate at a higher rotational speed than the first core shaft.

According to a twelfth aspect there is provided a method of operating the gas turbine engine, the method comprising operating the aircraft gas turbine engine at maximum take-off conditions such that a temperature of oil passing through each oil flow path increases by between 15 and 30° C. from the inlet to the outlet and a temperature of the oil at the inlet is less than 105° C.

Optional features according to the eleventh aspect may also apply to the method of the twelfth aspect.

According to a thirteenth aspect there is provided a gearbox for an aircraft gas turbine engine, the gearbox comprising:

a sun gear;

a plurality of planet gears surrounding and engaged with the sun gear; and a ring gear surrounding and engaged with the plurality of planet gears, each of the plurality of planet gears being rotatably mounted around a pin of a planet gear carrier with a journal bearing having an internal sliding surface on the planet gear and an external sliding surface on the pin, wherein a diameter of each journal bearing divided by a pitch circle diameter of the respective planet gear is less than around 55%.

The ring gear may have a pitch circle diameter of around 550 mm or greater.

The diameter of each journal bearing divided by the pitch circle diameter of the respective planet gear may be greater than around 50%.

With the aircraft gas turbine engine operating at maximum take-off conditions, a sliding speed of each journal bearing may be between around 30 m/s and around 40 m/s.

With the aircraft gas turbine engine operating at maximum take-off conditions, a specific operating load multiplied by an operating sliding speed of each journal bearing may be around 400 MPa m/s or greater.

With the aircraft gas turbine engine operating at maximum take-off conditions, the specific operating load multiplied by the operating sliding speed of each journal bearing may be up to around 720 MPa m/s.

The internal or external sliding surface of the journal bearing may have a surface coating comprising a layer of an alloy having aluminium or copper as a primary constituent.

A gas turbine engine for an aircraft may comprise:

an engine core comprising a turbine, a compressor, and a core shaft connecting the turbine to the compressor;

a fan located upstream of the engine core, the fan comprising a plurality of fan blades; and a gearbox according to the thirteenth aspect, the gearbox configured to receive an input from the core shaft and provide an output drive to the fan so as to drive the fan at a lower rotational speed than the core shaft.

Where the turbine is a first turbine, the compressor is a first compressor, and the core shaft is a first core shaft, the engine core may further comprise a second turbine, a second compressor, and a second core shaft connecting the second turbine to the second compressor, the second turbine, second compressor, and second core shaft being arranged to rotate at a higher rotational speed than the first core shaft.

In accordance with a fourteenth aspect there is provided a method of operating the gas turbine engine, the method comprising operating the engine core to drive the core shaft and providing an output drive from the gearbox to the fan to drive the fan at a lower rotational speed than the core shaft.

Optional features relating to the thirteenth aspect may also apply to the method of the fourteenth aspect.

According to a fifteenth aspect there is provided a gearbox for an aircraft gas turbine engine, the gearbox comprising:

a sun gear;

a plurality of planet gears surrounding and engaged with the sun gear; and a ring gear surrounding and engaged with the plurality of planet gears, each of the plurality of planet gears being rotatably mounted around a pin of a planet gear carrier with a journal bearing having an internal sliding surface on the planet gear and an external sliding surface on the pin, wherein, with the aircraft gas turbine engine operating at maximum take-off conditions, a minimum oil film thickness $H_{min}$ between the internal and external sliding surfaces is a function of a temperature T of oil flowing into the journal bearing, such that $H_{min}<B-AT$, where A is 0.139 μm/° C. and B is 27.8 μm.

The ring gear may have a pitch circle diameter of around 550 mm or greater.

In some examples $H_{min}$ may be greater than 2.3 μm.

In some examples, $H_{min}>B-AT$, where A is 0.034 μm/° C. and B is 6.4 μm.

In some examples, $H_{min}<B-AT$, where A is 0.117 μm/° C. and B is 22 μm.

T may be greater than around 60° C., optionally greater than around 100° C. T may be less than around 120° C.

A gas turbine engine for an aircraft may comprise:

an engine core comprising a turbine, a compressor, and a core shaft connecting the turbine to the compressor;

a fan located upstream of the engine core, the fan comprising a plurality of fan blades; and a gearbox according to the fifteenth aspect, the gearbox configured to receive an input from the core shaft and provide an output drive to the fan so as to drive the fan at a lower rotational speed than the core shaft.

Where the turbine is a first turbine, the compressor is a first compressor, and the core shaft is a first core shaft, the engine core may further comprise a second turbine, a second compressor, and a second core shaft connecting the second turbine to the second compressor, the second turbine, second compressor, and second core shaft being arranged to rotate at a higher rotational speed than the first core shaft.

According to a sixteenth aspect, there is provided a method of operating the gas turbine engine, the method comprising operating the aircraft gas turbine engine at maximum take-off conditions, a minimum oil film thickness $H_{min}$ between the internal and external sliding surfaces being a function of a temperature T of oil flowing into the journal bearing, such that $H_{min}<B-AT$, where A is 0.139 μm/° C. and B is 27.8 μm.

Optional features according to the fifteenth aspect may also apply to the method of the sixteenth aspect.

According to a seventeenth aspect there is provided a gearbox for an aircraft gas turbine engine, the gearbox comprising:

a sun gear;

a plurality of planet gears surrounding and engaged with the sun gear; and a ring gear surrounding and engaged with the plurality of planet gears, each of the plurality of planet gears being rotatably mounted around a pin of a planet gear carrier with a journal bearing having an internal sliding surface on the planet gear and an external sliding surface on the pin, wherein, with the aircraft gas turbine engine operating at maximum take-off conditions, an eccentricity ratio, E, of each journal bearing is a function of a temperature T of oil flowing into the journal bearing, such that $E>AT+B$ where A is 0.0015/° C. and B is 0.69.

The ring gear may have a pitch circle diameter of around 550 mm or greater.

The eccentricity ratio may be defined as $1-2H_{min}/c$, where $H_{min}$ is a minimum oil film thickness between the internal and external sliding surfaces and c is the diametral clearance of the journal bearing.

In some examples E may be less than around 0.98.

In some examples $E<AT+B$ where A is 0.00033/° C. and B is 0.94.

In some examples $E>AT+B$ where A is 0.00083/° C. and B is 0.84.

T may be greater than around 60° C., optionally greater than around 100° C.

T may be less than around 120° C.

A gas turbine engine for an aircraft may comprise:

an engine core comprising a turbine, a compressor, and a core shaft connecting the turbine to the compressor;

a fan located upstream of the engine core, the fan comprising a plurality of fan blades; and a gearbox according to the seventeenth aspect, the gearbox configured to receive an input from the core shaft and provide an output drive to the fan so as to drive the fan at a lower rotational speed than the core shaft.

Where the turbine is a first turbine, the compressor is a first compressor, and the core shaft is a first core shaft, the engine core may further comprise a second turbine, a second compressor, and a second core shaft connecting the second turbine to the second compressor, the second turbine, second compressor, and second core shaft being arranged to rotate at a higher rotational speed than the first core shaft.

According to an eighteenth aspect there is provided a method of operating the gas turbine engine, the method comprising operating the aircraft gas turbine engine at maximum take-off conditions, an eccentricity ratio, E, of each journal bearing being a function of a temperature T of oil flowing into the journal bearing, such that $E>AT+B$ where A is 0.0015/° C. and B is 0.69.

Optional features according to the seventeenth aspect may also apply to the method of the eighteenth aspect.

In accordance with a nineteenth aspect there is provided a gearbox for an aircraft gas turbine engine, the gearbox comprising:

a sun gear;

a plurality of planet gears surrounding and engaged with the sun gear; and a ring gear surrounding and engaged with the plurality of planet gears, each of the plurality of planet gears being rotatably mounted around a pin of a planet gear carrier with a journal bearing having an internal sliding surface on the planet gear and an external sliding surface on the pin, wherein, with the aircraft gas turbine engine operating at maximum take-off conditions, a Sommerfeld number of each journal bearing is greater than around 4.

The ring gear may have a pitch circle diameter of around 550 mm or greater.

An inefficiency of each journal bearing, defined as a percentage power loss under maximum take-off conditions, may be less than around 0.225%.

A diametral clearance of each journal bearing may be between around 1‰ and 2‰. The diametral clearance of each journal bearing may be between around 1.4‰ and 1.6‰.

With the aircraft gas turbine engine operating at maximum take-off conditions, a temperature of oil flowing into each journal bearing may be less than or equal to around 100° C.

With the aircraft gas turbine engine operating at maximum take-off conditions, a pressure of oil flowing into each journal bearing at maximum take-off conditions may be within a range from around 50 kPa to around 350 kPa.

A gas turbine engine for an aircraft may comprise:

an engine core comprising a turbine, a compressor, and a core shaft connecting the turbine to the compressor;

a fan located upstream of the engine core, the fan comprising a plurality of fan blades; and a gearbox according to the nineteenth aspect, the gearbox configured to receive an input from the core shaft and provide an output drive to the fan so as to drive the fan at a lower rotational speed than the core shaft.

Where the turbine is a first turbine, the compressor is a first compressor, and the core shaft is a first core shaft, the engine core may further comprise a second turbine, a second compressor, and a second core shaft connecting the second turbine to the second compressor, the second turbine, second compressor, and second core shaft being arranged to rotate at a higher rotational speed than the first core shaft.

According to a twentieth aspect there is provided a method of operating the gas turbine engine, the method comprising operating the aircraft gas turbine engine at maximum take-off conditions, wherein a Sommerfeld number of each journal bearing is greater than around 4.

The sliding speed of each journal bearing, according to any of the above aspects, may at maximum take-off conditions be 30, 31, 32, 33, 34, 35, 36, 37, 38, 39, 40, 41, 42, 43, 44, 45, 46, 47, 48, 49 or 50 m/s or within a range defined by any two of the aforementioned values.

The specific operating load of each journal bearing, according to any of the above aspects, may at maximum take-off conditions be 5, 6, 7, 8, 9, 10, 11, 12, 13, 14, 15, 16, 17, 18, 19, 20. 21. 22. 23. 24 or 25 MPa or within a range defined by any two of the aforementioned values.

The gas turbine engine may, in each of the above aspects, comprise a turbine, a compressor, a core shaft connecting the turbine to the compressor and a fan located upstream of the engine core, the fan comprising a plurality of fan blades. The fan may have a moment of inertia of between around $5.5 \times 10^7$ and $9 \times 10^8$ kg m$^2$, or alternatively between around $7.4 \times 10^7$ and $7 \times 10^8$ kg m$^2$, or alternatively between around $8.3 \times 10^7$ and $6.5 \times 10^8$ kg m$^2$. The same features may also apply to the other aspects of the invention.

The gearbox may, in each of the above aspects, have a gear ratio of 3.2 to 4.5, and optionally 3.2 to 4.0. The gearbox may be in a star configuration.

The gas turbine engine may, in each of the above aspects, have a specific thrust from 70 to 90 N kg$^{-1}$; and/or a bypass ratio at cruise conditions of 12.5 to 18 or 13 to 16.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

The gearbox receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity U tip. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and U tip is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $J\ kg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 N $kg^{-1}$s, 105 N $kg^{-1}$s, 100 N $kg^{-1}$s, 95 N $kg^{-1}$s, 90 N $kg^{-1}$s, 85 N $kg^{-1}$s or 80 N $kg^{-1}$s. The specific thrust may be in an inclusive range bounded by any two of the values in the previous sentence (i.e. the values may form upper or lower bounds), for example in the range of from 80 N $kg^{-1}$s to 100 N $kg^{-1}$s, or 85 N $kg^{-1}$s to 95 N $kg^{-1}$s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 KN, 200 kN, 250 kN, 300 kN, 350 KN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9. Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

As used herein, a maximum take-off (MTO) condition has the conventional meaning. Maximum take-off conditions may be defined as operating the engine at International Standard Atmosphere (ISA) sea level pressure and temperature conditions +15° C. at maximum take-off thrust at end of runway, which is typically defined at an aircraft speed of around 0.25 Mn, or between around 0.24 and 0.27 Mn. Maximum take-off conditions for the engine may therefore be defined as operating the engine at a maximum take-off thrust (for example maximum throttle) for the engine at ISA sea level pressure and temperature +15° C. with a fan inlet velocity of 0.25 Mn.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
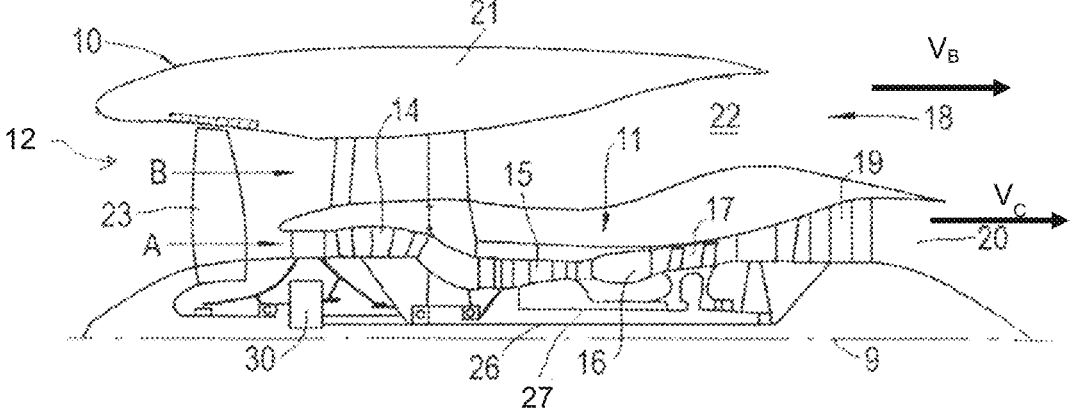
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
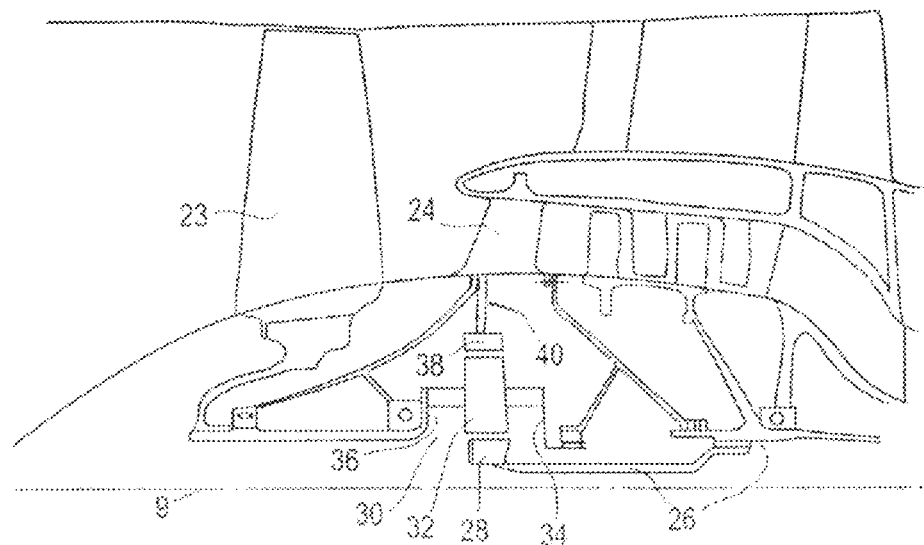
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
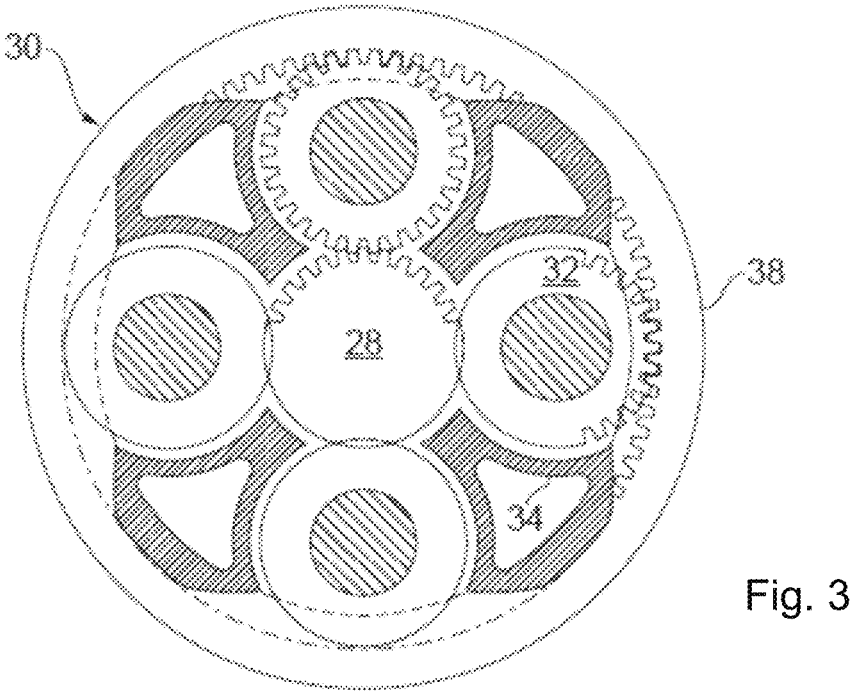
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. While the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually orthogonal.

Figure 4:
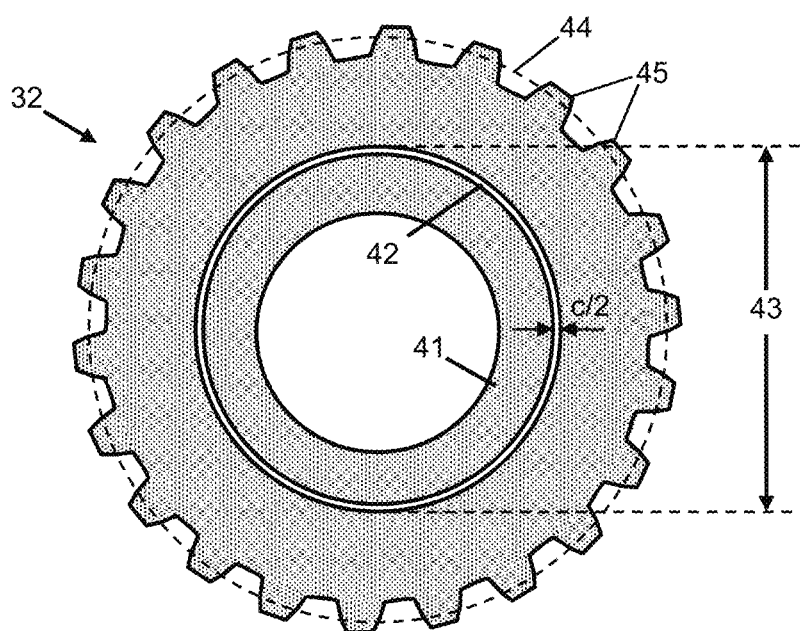
FIG. 4 is a schematic transverse sectional view across an example planet gear mounted on a pin of a planet gear carrier with a journal bearing.

FIG. 4 illustrates schematically an example planet gear 32 of the type shown in the example epicyclic gearbox 30 of FIG. 3. The planet gear 32 is mounted around a pin 41, the inner surface of the planet gear 32 and the outer surface of the pin 41 forming sliding surfaces of a journal bearing 42, allowing the planet gear 32 to rotate relative to the pin 41. In use, the sliding surfaces are lubricated with oil to allow the planet gear 32 and pin 41 to rotate smoothly relative to each other. The gap between the sliding surfaces is shown exaggerated in FIG. 4 for clarity.

The sliding surfaces of the journal bearing 42 in the example of FIG. 4 are shown as the inner surface of the planet gear 32 and outer surface of the pin 41. In alternative examples, a sleeve may be provided around the pin 41, an outer surface of which provides the inner sliding surface of the journal bearing 42, the sleeve being fixed to the outer surface of the pin 41, for example by an interference fit. A bush (or bushing) may alternatively or additionally be provided, the inner surface of which provides the outer sliding surface of the journal bearing 42, the bush being fixed to the inner surface of the planet gear 32, for example by an interference fit between the bush and the gear 32. An advantage of forming the sliding surfaces of the journal bearing 42 from the pin 41 and planet gear 32 themselves is that tolerances of the journal bearing 42 can be more tightly controlled, while an advantage of using one or both of a sleeve and a bush is that the journal bearing may be more readily repaired by replacing one or both components when worn.

The planet gear 32 is defined by an inner surface diameter 43, which may also be defined as the diameter of the journal bearing 42, and an outer pitch circle diameter 44. The planet gear 32 comprises a plurality of teeth 45 extending around the outer circumference of the gear 32. The total number of teeth 45 may differ from that shown in FIG. 4 depending on the specifics of the application. The teeth 45 may be arranged in a spur gear or helical gear form, i.e. either parallel or at an angle to the rotational axis of the gear 32. A helical gear form is a more common arrangement because this allows for a smoother transition between the gear teeth 45 of the planet gear 32 and corresponding teeth on the ring gear 38 and sun gear 28 (FIG. 3) as the gears rotate relative to each other.

Figure 5:
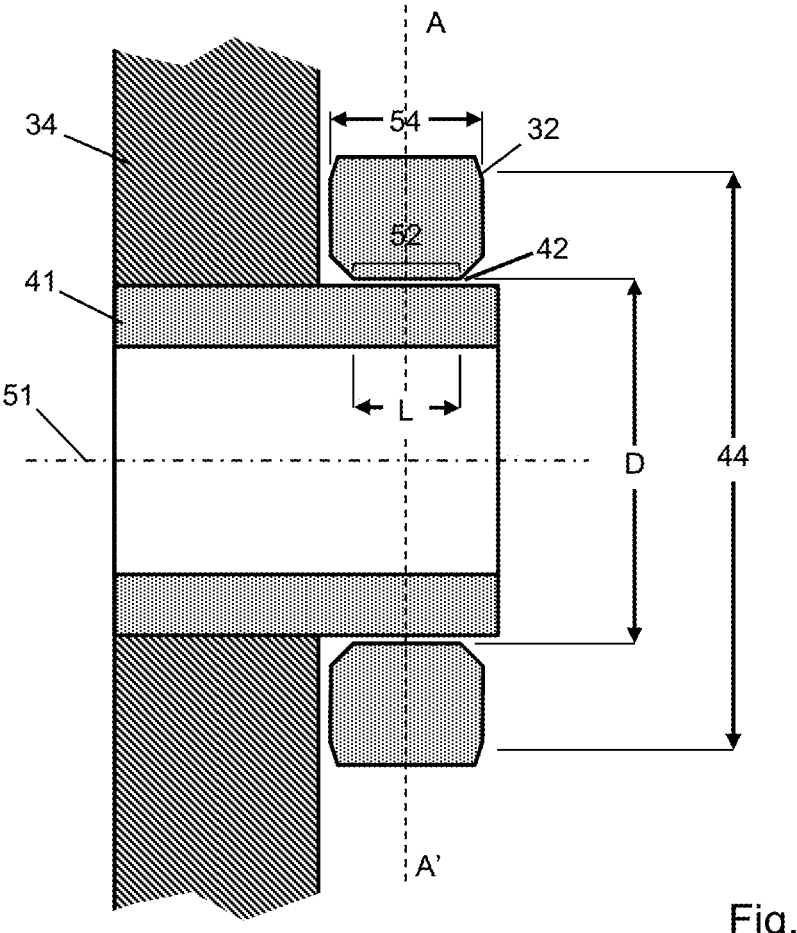
FIG. 5 is a schematic longitudinal sectional view through the example planet gear of FIG. 4.

FIG. 5 illustrates schematically an axial section through the planet gear 32 and pin 41 of FIG. 4. The transverse section shown in FIG. 4 is taken along the line A-A' indicated in FIG. 5. The pin 41 is mounted to the planet carrier 34, in this example by extending through the thickness of the planet carrier 34. The pin 41 may be fixed to the carrier 34 by welding, bolting or by otherwise securing the pin 41 and carrier 34 to prevent relative movement between the pin 41 and carrier 34 when in use. In operation, forces are transmitted between the pin 41 and carrier 34 primarily through shear forces on the pin 41 transverse to the axis 51 of the pin 41, which also result in bending moments applied to the pin 41 along the axis 51. In a star gearbox arrangement, in which the planet carrier 34 is fixed relative to the engine frame, the net forces on the planet gears 32 act in a direction tangential to a diameter of the planet gear 32 centres. In a planetary gearbox arrangement, in which the outer ring gear 38 (FIG. 3) is fixed, the net forces on the planet gears 32 are tilted towards the centre of the sun gear due to the additional centripetal force component required to maintain the planet gears 32 rotating about the sun gear 28, the centripetal force being a function of the rotational speed of the planet carrier 34. An advantage of the gearbox being configured in a star arrangement is that loading on the pins is reduced when the gearbox is operating at high speeds.

The planet gear 32 is shown in FIG. 5 with a journal bearing portion 52 having a length L smaller than a total width 54 of the planet gear 32. The length L of the journal bearing 42 may be selected according to the loads experienced during operation of the gearbox and to optimise a ratio between the journal bearing length L and the diameter D of the journal bearing 42. The diameter D may be defined by either the outer sliding surface, corresponding to the inner surface of the planet gear 32 in the example shown in FIG. 5, by the inner sliding surface, corresponding to the outer surface of the pin 41, or by a mean diameter between the two. In practice, the difference between the two diameters, termed the diametral clearance c (the distance c/2 being shown in FIG. 4), is small, typically within less than 0.5% of either diameter. For an example range of diameters of between 120 mm and 200 mm, the difference may be between around 0.1% and 0.3%, i.e. between around 120 $\mu$m and around 600 $\mu$m, with a typical diametral clearance of around 150 $\mu$m.

The length 52 of the journal bearing 42 may in some examples be the same as, or greater than, the total width of the planet gear 32.

In particular examples, a ratio L/D of the length L of the journal bearing 42 to the diameter D of the journal bearing 42 may be in a range from around 0.5 to 1.4, optionally between around 1.1 and 1.3. A lower L/D ratio reduces misalignment of the gears 32 relating to the pins 41, in part by reducing the bending moment applied to the pins, thereby keeping the pins 41 more parallel with the gears 32. The L/D ratio should, however, be kept above around 0.5, or optionally around 1.1, to avoid the specific loading on the journal bearing from becoming too high and adversely affecting the lifetime of the bearing.

Figure 6:
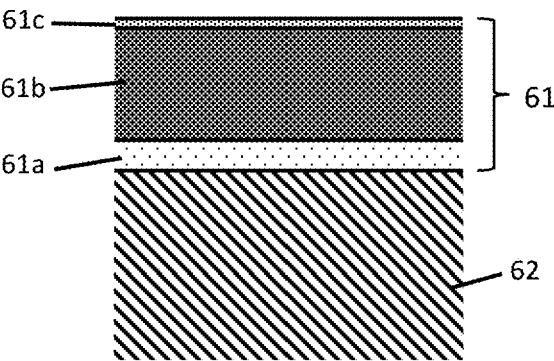
FIG. 6 is a partial sectional view through an external surface of an example planet gear journal bearing.

FIG. 6 illustrates schematically an example structure of a surface coating 61 that may be applied to either sliding surface of the journal bearing 42. The underlying material 62 may be either the pin 41 or the ring gear 32, or in alternative examples may be a sleeve or bush of the type described above. The overall thickness of the surface coating 61 may be in the region of between 40 and 200 micrometres thick, with a specific example thickness in the region of around 100 micrometres.

Although the surface coating 61 may be applied to either surface of the journal bearing 42, applying the coating 61 to the outer surface of the pin 41 may in practice be preferable due to practical limitations of deposition methods for internal surfaces. Common deposition methods such as physical vapour deposition (PV D) may be more suitable for application of coatings to an external rather than internal surface. Other techniques such as casting may be more applicable for application of a coating to an internal surface, although casting is generally less suitable for creating a coating of the thickness range defined above, and with the tolerances required for journal bearings.

An example surface coating 61 may comprise three layers 61a-c. A first layer 61a is deposited that has a thermal expansion coefficient between that of the underlying material 62 and the second layer 61b. With steel as the underlying material, the first layer 61a may for example be a copper-based alloy. The second layer 61b, which typically forms the largest thickness layer in the surface coating 61, i.e. having a thickness of between around 50% and 95% of the total thickness of the surface coating 61, may be composed of a copper- or aluminium-based alloy, i.e. a metallic alloy having either copper or aluminium as a primary constituent, an example being a leaded bronze, i.e. an alloy of copper, lead and tin. Such an alloy is selected to have a lower hardness compared with that of the material forming the other surface of the journal bearing, so that any particles that are not filtered out from the oil may instead become embedded in the second layer 61b, reducing their ability to wear the surfaces of the journal bearing.

The third layer 61c may be one that is considerably thinner than the first and second layers 61a, 61b and composed of a material having a lower hardness than the second layer 61b, for example a lead-based alloy. The third layer acts to reduce friction between the surfaces of the journal bearing, particularly when starting from a stationary position where an oil layer between the surfaces has not been built up. The third layer 61c may for example have a thickness of between 1 and 10 micrometres.

In a particular example, the first layer 61a may be between 10 and 20 micrometres in thickness, the second layer between around 40 and 100 micrometres in thickness and the third layer between around 1 and 15 micrometres or between 1 and 10 micrometres or between 5 and 15 micrometres or between 10 and 15 micrometres in thickness.

The bearing materials have been developed to provide an optimum compromise between 'hard/strong' and 'soft/flexible' for the specific application in a gearbox for a gas turbine engine. 'Hard' properties address the requirements of contact wear resistance, fatigue, and load carrying capacity. 'Soft' properties are advantageous to provide compatibility (to the countersurface), conformability, and embeddability of the surface. It has been found that this may help to ensure continued operation in imperfect conditions. In addition, the proposed arrangement has been developed to address environmental factors such as corrosion and oxidation resistance In a specific example, the coating layer 61b may be an (aluminium-tin-copper alloy (for example SA E 783). In another specific example, a leaded bronze alloy (such as SA E 49) may be used for the coating layer 61b. Such alloys have been found to be suitable for an arduous duty cycle, for example where the maximum operating specific load multiplied by the maximum operating sliding speed is around 240 MPa m/s or greater. The soft properties at the running surface can be further enhanced with a thin overlay coating 61c (for example up to around 12 μm) such as SA E 194 lead-indium without compromising the load carrying capacity of the underlying material.

Figure 7:
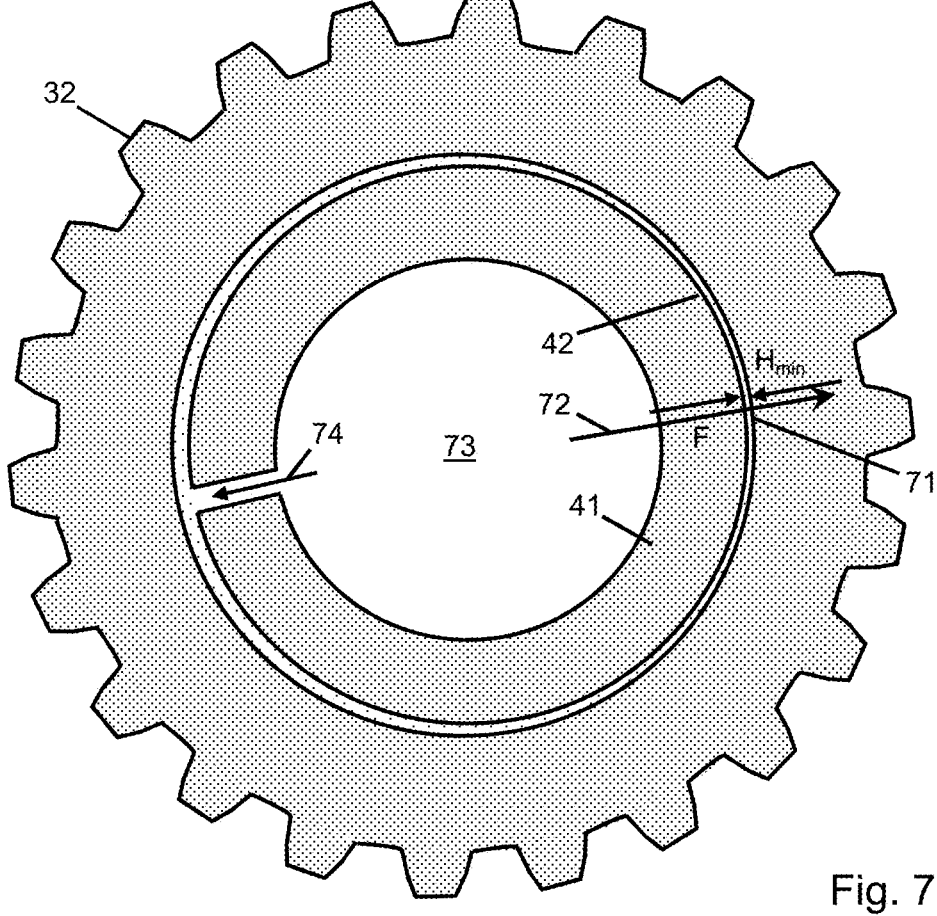
FIG. 7 is a schematic drawing of a transverse section of an example planet gear, showing an exaggerated oil film thickness variation.

FIG. 7 illustrates a schematic cross-sectional view of a gear 32 mounted around a pin 41, forming a journal bearing 42 between the outer surface of the pin 41 and the inner surface of the gear 32. A difference in inner and outer diameter between the gear 32 and pin 41 respectively, i.e. the diametral clearance, is exaggerated to show a variation in oil film thickness that arises when the gearbox is in operation. The oil film thickness is lower over a portion 71 of the journal bearing where a load F is transferred between the pin 41 and the gear 32, for example in the direction indicated by arrow 72. A specific loading on the journal bearing 42 is defined by the load F on the bearing 42 applied over an area defined by the length L and diameter D of the bearing 42, i.e. the specific loading is F/LD, typically measured in MPa or N/mm$^2$.

An oil flow path through the journal bearing 42 passes through a central bore 73 of the pin 41 through an inlet passage 74 and into a clearance between the pin 41 and gear 32. The oil flows around the journal bearing, dragged through the minimum clearance by the relative rotation between the pin 41 and gear 32, and exits via the edges of the bearing 42. Oil is cooled and recirculated via a scavenge and pump (not shown). The oil flowing into the journal bearing may be pressurised to between around 50 and 350 kPa (0.5 to 35 bar). A minimum oil pressure is required to provide sufficient oil to the bearing so that the area over which force is applied is covered with a supply of oil. Higher pressures will tend to force greater amounts of oil through the bearing, but have diminishing effects on lubricating and cooling the bearing as greater amounts will tend to travel via the wider portion of the clearance between the pin 41 and gear 32 rather than via the minimum clearance portion 71. Higher oil pressures will tend to reduce the temperature difference between the inlet and outlet oil flows, which makes extraction of heat more difficult, requiring larger heatsinks. An optimum oil flow pressure and temperature difference will therefore tend to be required to minimise on weight in relation to oil pumps and heatsinks. The pressure and temperature differences defined herein have thus been chosen to provide the required lubrication, but with a sufficiently high temperature difference to enable sufficiently low weight of heat exchangers to remove the heat. The low weight of heat exchanger may be a particularly important consideration for gearboxes to be used in a gas turbine for an aircraft, because of the importance of weight on the overall fuel consumption of the aircraft to which the engine is provided.

The dimensional and positional accuracy of the pins 41 and gears 32 of the gearbox will affect how the oil film thickness varies, as well as the viscosity and temperature of the oil. To maintain a uniform oil temperature across each journal bearing, symmetric oil feed paths may be provided in the gearbox, and a plenum for mixing oil prior to being fed into the gearbox may be sufficiently large to allow for a uniform temperature of oil being fed into the gearbox at different feed points. As a result, a temperature variation between oil fed to each of the journal bearings may be no more than 1 degree Celsius, for example with the engine operating at cruise conditions. A variation in oil pressure is preferably also uniform between the journal bearings, but this will typically have less effect than a variation in temperature because an increase in pressure above a minimum required will tend to simply cause more oil to flow through the bearing, having minimal effect on operation.

The operational oil film thickness, i.e. the thickness of the oil film in each journal bearing during operation of the engine, may be defined as a proportion of the journal bearing diameter. The minimum operational oil film thickness for each journal bearing during operation, for example at MTO conditions, at which loading of the gearbox is at its highest, may be less than around 8 micrometres for a journal bearing diameter of between around 120 mm and 200 mm, and optionally greater than around 3.5 micrometres. The clearance of the journal bearing may typically be between around 1 and 3‰ (0.1% and 0.3%) of the journal bearing diameter, for example around 1.5‰ (0.15%). The journal bearing diameter may, as described above, be defined as the diameter of the inner sliding surface of the planet gear. A variation between the minimum operational thickness of each journal bearing, also for example at MTO conditions, may be less than around 8% of a mean minimum oil film thickness. For example, if the mean minimum oil film thickness is around 6 micrometres, the maximum difference between the minimum oil film thickness across all of the journal bearings will be around +/− around 0.5 micrometres.

The operational oil film thickness will, as illustrated schematically in FIG. 7, vary around each journal bearing between a minimum thickness at a point of maximum loading to a maximum thickness at a point diametrically opposite from the point of maximum loading. The point of maximum loading will tend to follow a linear path along the length of the journal bearing parallel to its axis of rotation. A ratio between the maximum and minimum oil film thickness will be highest during maximum take-off conditions and will be around 1 at idle conditions, i.e. with no significant load being transferred across the gearbox.

Figure 8:
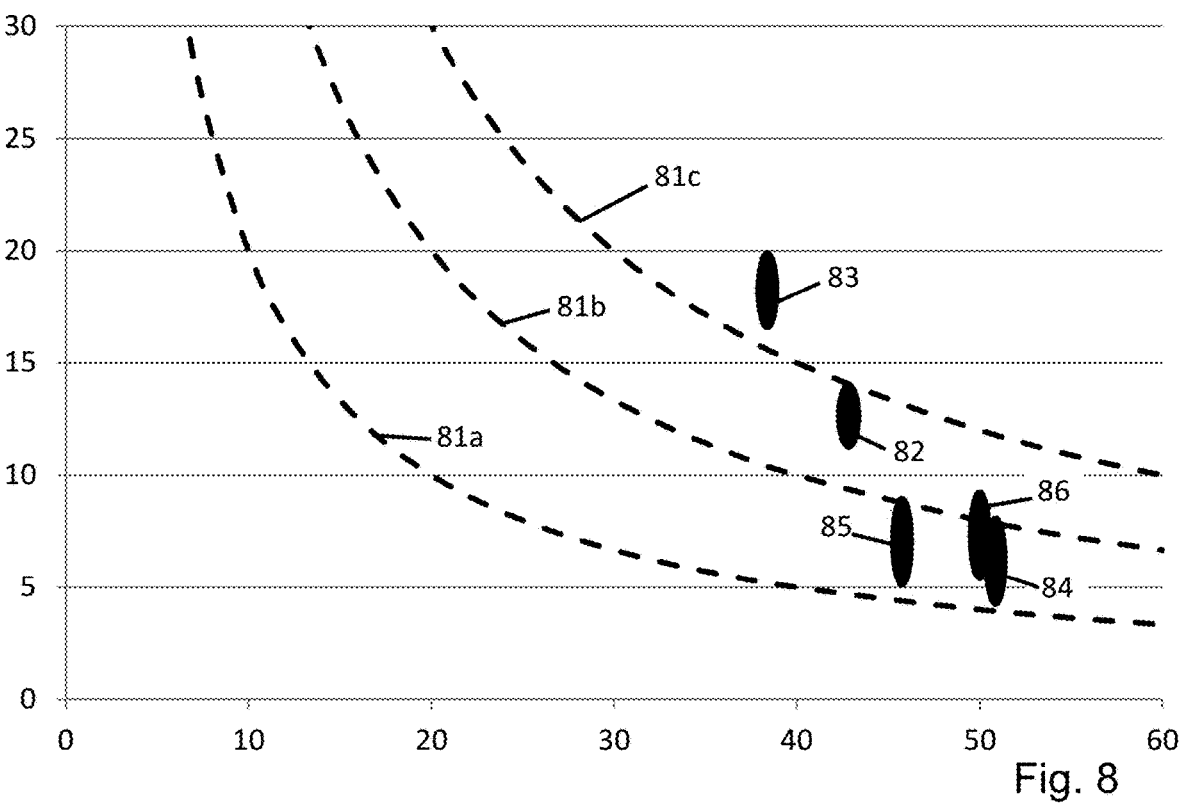
FIG. 8 is a schematic plot of operating specific load as a function of sliding speed for a number of example gearboxes.

FIG. 8 illustrates an example plot of operating specific load (y axis, in MPa) as a function of sliding speed (x axis, in m/s) for journal bearings in a range of example gearboxes of the type disclosed herein, each operating under maximum take-off conditions. The specific loading for a journal bearing is as defined above. The sliding speed for a journal bearing is defined as the relative tangential speed of the inner and outer surfaces of the journal bearing. The dotted lines 81a, 81b, 81c represent constant values for a multiple of operating specific loading and sliding speed, which may be termed PV (being a multiple of pressure and velocity), of 200, 400 and 600 MPa m/s respectively.

At higher specific loads or sliding speeds, or higher values of PV in general, a surface coating comprising a layer of an alloy having aluminium or copper as a primary constituent, for example forming the second layer 61b as shown in FIG. 6, may be used. Copper as a primary constituent may be preferable for higher diameter journal bearings, for example greater than 120 mm in diameter.

The maximum operating specific loading of each journal bearing in the gearbox may be greater than 5 MPa, or may be greater than any one of 6 MPa, 7 MPa, 8 MPa, 9 MPa, 10 MPa, 11 MPa, 12 MPa, 13 MPa, 14 MPa, 15 MPa, 16 MPa or 17 MPa. The maximum sliding speed of the journal bearings may be defined by the corresponding sliding speed for the curves 81a-c shown in FIG. 8. In particular examples, the maximum operating specific loading may be around 13 MPa or around 18 MPa, with a sliding speed in each case of around 42 or 38 m/s, indicated as data points 82, 83 respectively on FIG. 8. In a general aspect, the specific loading may be within a range from around 10 to 20 MPa and the sliding speed within a range from around 35 to 45 m/s at maximum take-off conditions. These ranges may apply in particular for a planetary gearbox arrangement.

Points 82, 83 represent specific pressure and sliding speed values at maximum take-off conditions for journal bearings in two example planetary gearboxes, with journal bearing diameters of around 155 and 140 mm respectively and journal bearing L/D ratios of around 1.11 and 1.24 respectively, both with a diametral clearance of around 1.5‰. The PV values at maximum take-off conditions for points 82 and 83 are around 560 and 650 MPa m/s respectively.

Points 84, 85 and 86 in FIG. 8 represent specific pressure and sliding speed values at maximum take-off conditions for journal bearings in three example star gearboxes of different sizes, with journal bearing diameters of around 100, 120 and 180 mm respectively and journal bearing L/D ratios of around 1.45, 1.35 and 1.13 respectively, each with a diametral clearance of around 1.5‰. The PV values at maximum take-off conditions for points 84, 85 and 86 are around 325, 335 and 370 MPa m/s. In a general aspect, the specific loading for such examples may be within a range from around 5 to 10 MPa and the sliding speed within a range from around 45 to 55 m/s at maximum take-off conditions. The PV values may be in a range having a lower limit of any one of 200, 220, 240, 260, 230 or 300 MPa m/s and an upper limit of any one of 310, 330, 350, 370, 390, 410 or 430 MPa m/s.

In a further general aspect therefore, the specific loading for the above-mentioned examples may be within an overall range from around 5 to 20 MPa and the sliding speed within a range from around 30 or 35 to 50 or 55 m/s at maximum take-off conditions.

The higher specific loads for the planetary gearbox journal bearings (points 82, 83) partly reflect the additional centripetal loading on each journal bearing due to the rotation of each planet gear about the central sun gear, while the planet gears in the star gearboxes (points 84, 85, 86) do not rotate about the central sun gear.

The y-axis spread of specific load on each of the data points 82-86 represents the variation in specific load over a +/−10% variation in torque load around a nominal torque load at maximum take-off conditions.

An upper limit for PV may be around 720 MPa m/s, while a lower limit may be around 240 or 300 MPa m/s. Upper limits may alternatively be defined by an upper limit for one or both of the sliding speed and operating specific load, for example an upper limit of around 45, 50, 55 or 60 m/s for the sliding speed and an upper limit of around 10, 20 or 30 MPa for the operating specific loading. Lower limits may be defined by sliding speeds of around 30, 35, 40 or 45 m/s, or by specific loads of around 5 or 10 MPa, among others specified herein.

Figure 9:
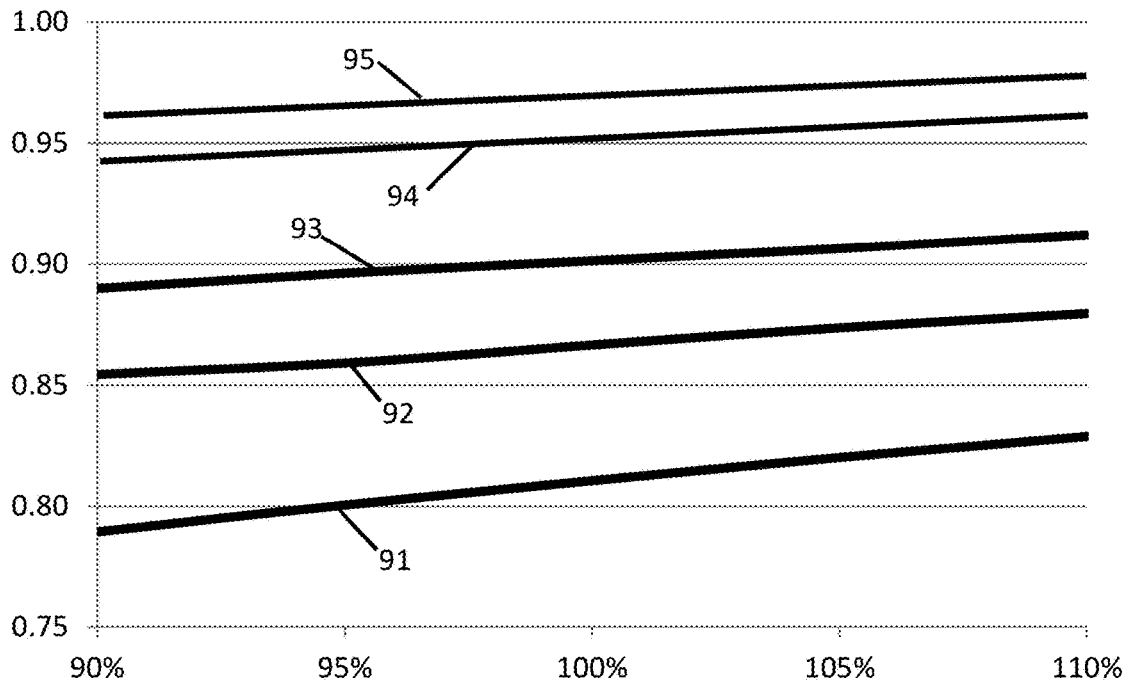
FIG. 9 is a schematic plot of eccentricity ratio as a function of percentage loading for a number of example gearboxes.

The eccentricity ratio of a journal bearing during operation of the gas turbine engine, for example while operating at MTO conditions, is defined as $1-2H_{min}/c$, where $H_{min}$ is the minimum oil film thickness (shown in FIG. 7) and c the diametral clearance (shown in FIG. 4, with the gear 32 and pin 41 arranged concentrically). FIG. 9 illustrates the variation in eccentricity ratio (y axis) for a range of example gearboxes as a function of percentage of the journal bearing design load (x axis). First, second and third example star gearboxes 91,92, 93 (corresponding to the same gearbox designs having data points 84, 85, 86 respectively in FIG. 8) exhibit a variation in eccentricity ratio of between around 0.2 and 0.3 between 90% and 110% of design load, and have eccentricity ratios that range between around 0.79 and 0.91 over this range of design loads. Eccentricity ratios 94, 95 for first and second example planetary gearboxes (corresponding to gearbox designs having data points 82 and 83 in FIG. 8), having higher absolute design loads, are between around 0.94 and 0.97 over a similar design load range, with the eccentricity ratio varying within this range by between around 0.03 and around 0.05.

Figure 10:
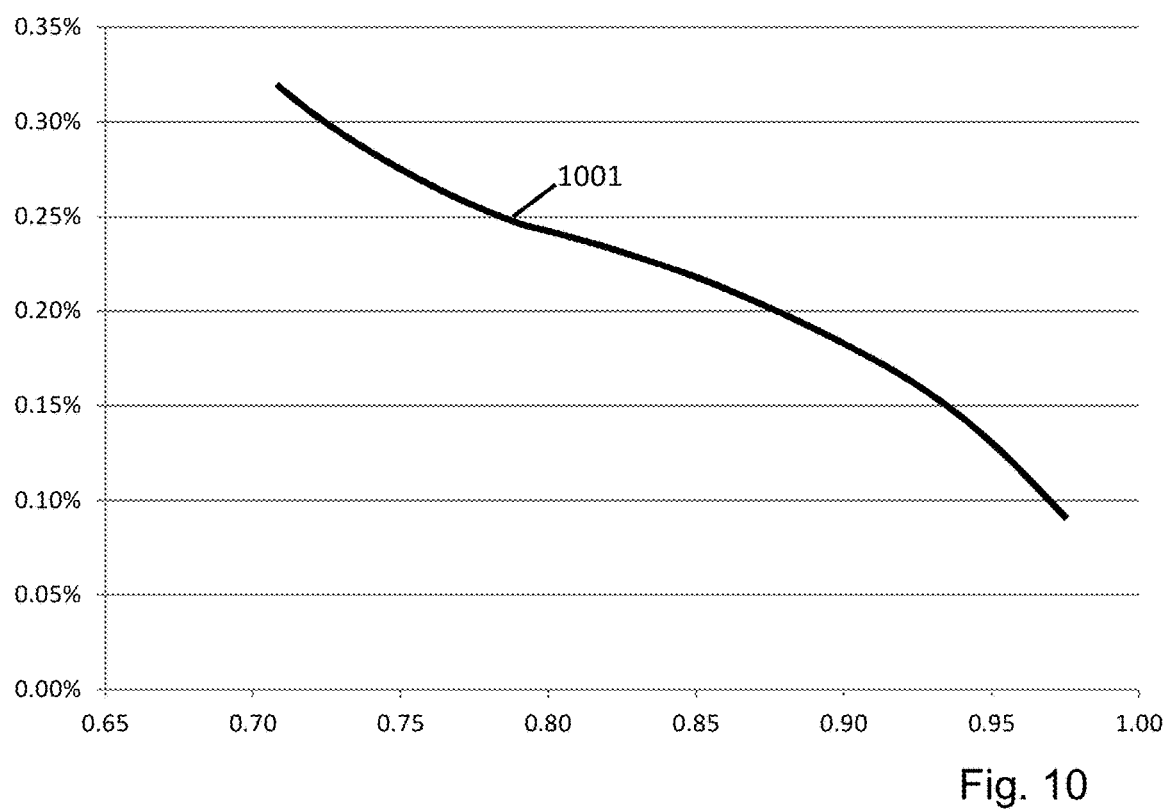
FIG. 10 is a schematic plot of inefficiency as a function of eccentricity ratio of journal bearings for a range of example gearboxes operating at maximum take-off conditions.

The diametral clearance, c, may be within a range of between around 1 and 2‰, i.e. between around 0.1 and 0.2%. A smaller diametral clearance will tend to increase the area over which the pressure between the inner and outer surfaces of the journal bearing is distributed, but this will be in combination with a narrower path through which the oil through the bearing is forced as the bearing rotates, limiting the flow rate of oil through the bearing and ultimately causing the bearing to seize as the diametral clearance is reduced further. A higher diametral clearance will tend to reduce the area over which the pressure is distributed but will also make travel of the oil through the bearing easier. An optimum balance between the factors is therefore required which, particularly for higher eccentricity ratios of between around 0.94 and 0.97, may be between around 1 and 2‰, and optionally between around 1.4 and 1.6‰. FIG. 10 is a schematic plot of inefficiency as a function of eccentricity ratio for the above-mentioned range of gearboxes. The example star gearboxes tend to have higher inefficiencies, ranging between around 0.17 and 0.3%, while the example planetary gearboxes have inefficiencies between around 0.1 and 0.16%. The eccentricity ratios range between values as stated above. The variation of inefficiency versus eccentricity follows the general trend 1001 shown in FIG. 10, with a higher eccentricity ratio resulting in a higher efficiency, i.e. a lower inefficiency. A range of eccentricity ratios may be as previously stated, while a range of inefficiency may be less than around 0.225%, and may be between around 0.225 and around 0.1%. Increasing the eccentricity ratio further will tend to increase the risk of the journal bearing seizing due to the minimum thickness of the oil film becoming too small to sustain an oil film separating the pin and gear under the required range of loading.

25

Figure 11:
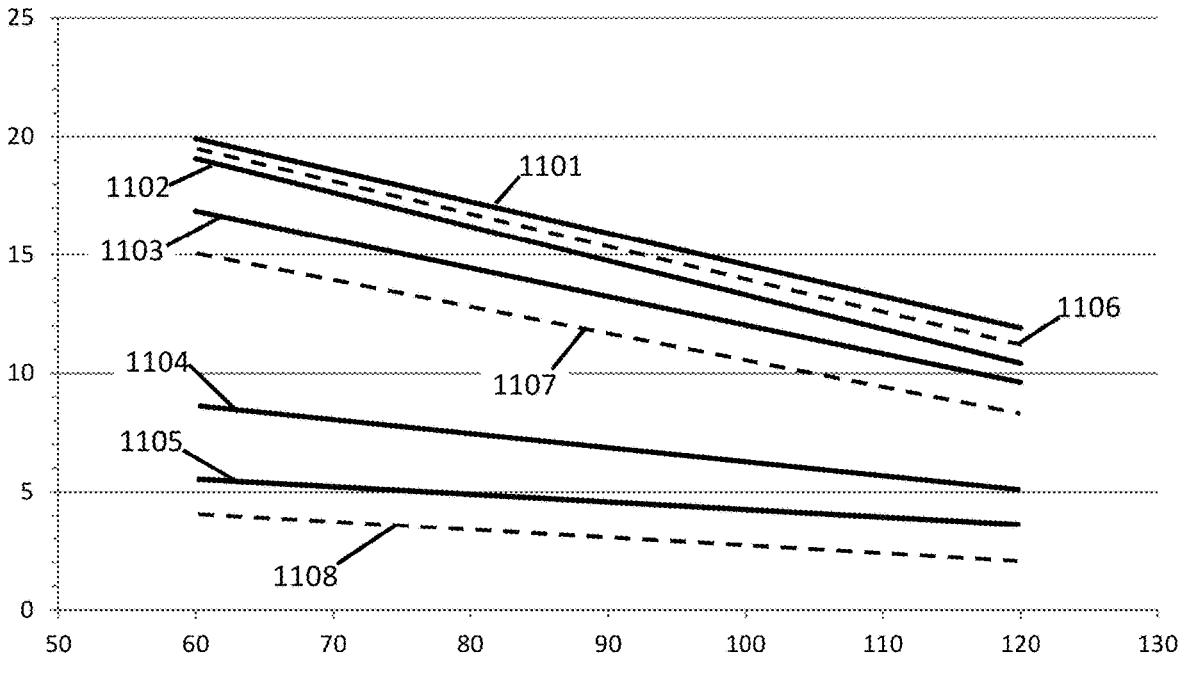
FIG. 11 is a schematic plot of minimum oil film thickness as a function of oil inlet temperature for a range of example gearboxes operating at maximum take-off conditions.

FIG. 11 illustrates a series of trendlines of $H_{min}$ (in µm) as a function of oil inlet temperature (in ° C.) for the above-mentioned example star and planetary gearboxes, all operating at maximum take-off conditions. The star gearboxes (lines 1101, 1102, 1103) tend to have higher $H_{min}$ values over the range of temperatures and with trendlines having a steeper gradient, while the planetary gearboxes (lines 1104, 1105) tend to have lower $H_{min}$ values and with more shallow gradients. Each trendline tends to follow a function of the form $H_{min}$=B−AT, where T is temperature (in ° C.) and A and B are constants that are characteristic of the particular gearbox design. Except for one of the star gearboxes, the minimum oil film thickness $H_{min}$ at maximum take-off conditions for each gearbox is within a region having an upper bound defined by the line 1106, where A is 0.139 µm/° C. and B is 27.8 µm. A minimum value of $H_{min}$ may be around 2.3 µm, below which the oil film may be insufficient to prevent seizing of the journal bearing. Two further lines 1107, 1108 define further upper and lower bounds respectively, with line 1107 defined by A=0.117 µm/° C. and B=22 µm and line 1108 defined by A=0.034 µm/° C. and B=6.4 µm. An overall range for the inlet oil temperature may be between 6° and 120° C., with an optional range of greater than around 100° C. and less than around 120° C. At lower temperatures the oil viscosity increases, reducing lubrication efficiency, whereas at higher temperatures the resulting lower oil viscosity may cause the minimum oil film thickness to become too small.

Figure 12:
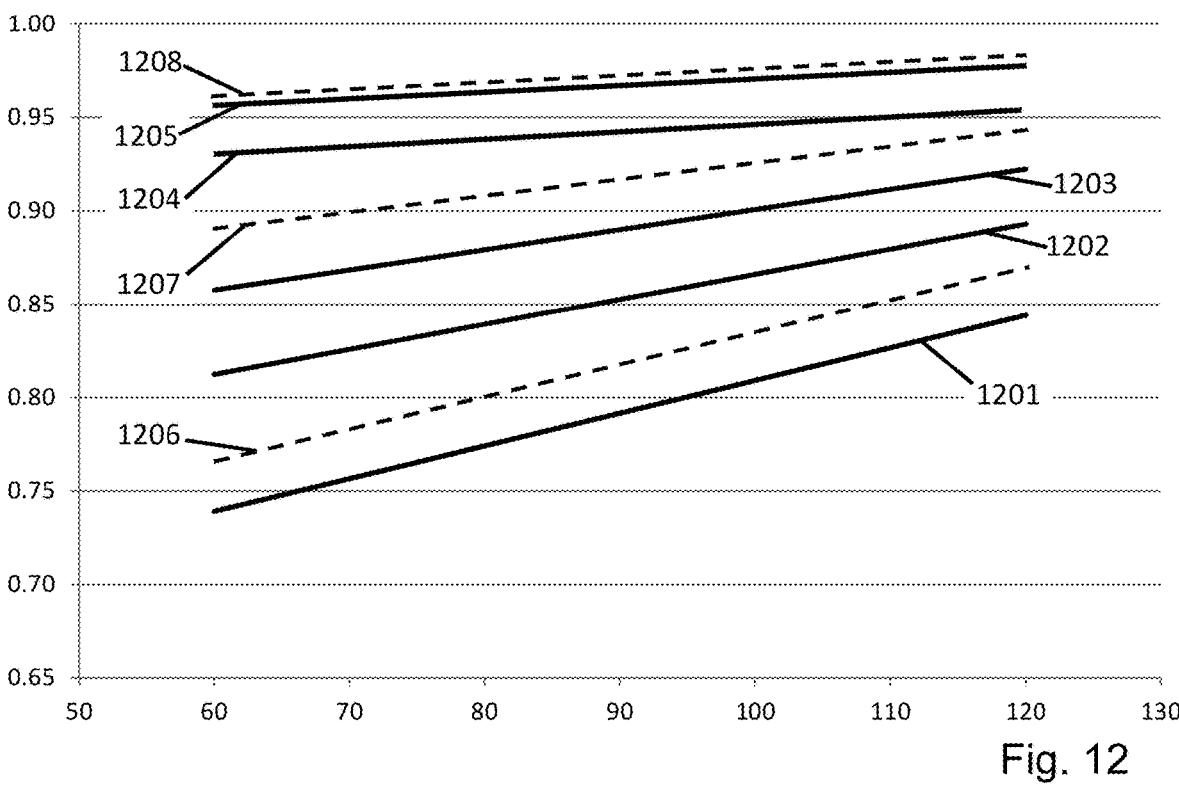
FIG. 12 is a schematic plot of eccentricity ratio as a function of oil inlet temperature for a range of example gearboxes operating at maximum take-off conditions.

FIG. 12 illustrates a series of trendlines of eccentricity ratio, E, of journal bearings of the various example gearboxes as a function of oil inlet temperature, with the gearbox in each case operating at maximum take-off conditions. The star gearboxes (lines 1201, 1202, 1203) tend to have lower values of E over the entire temperature range and trendlines having steeper gradients, while the planetary gearboxes (lines 1204, 1205) tend to have higher values of E and more shallow gradients. In each case the trendline tends to follow a function of the form E=AT+B where T is the oil inlet temperature and A and B constants. A maximum value for E may be around 0.98, above which the oil film may be too small to sustain lubrication of the journal bearing. The eccentricity ratio E may be above a trendline 1206 defined by A=0.0015/° C. and B=0.69, or alternatively may be above a trendline 1207 defined by A=0.00083/° C. and B=0.84, and may be below a trendline 1208 defined by A=0.00033/° C. and B=0.94. As for the examples in FIG. 11, an overall range for the inlet oil temperature may be between 6° and 120° C., with an optional range of greater than around 100° C. and less than around 120° C.

The Sommerfeld number, S, of a journal bearing is defined as:

$$S = \left(\frac{d}{c}\right)^2 \frac{\mu N}{P}$$

where d is the outer diameter of the pin 41 (FIG. 7), c is the diametral clearance, u is the absolute viscosity of the lubricant, N the relative rotational speed of the journal bearing (in revolutions per second) and P is the loading applied across the projected bearing area, i.e. F/LD, where L is the journal bearing length and D the diameter.

Figure 13:
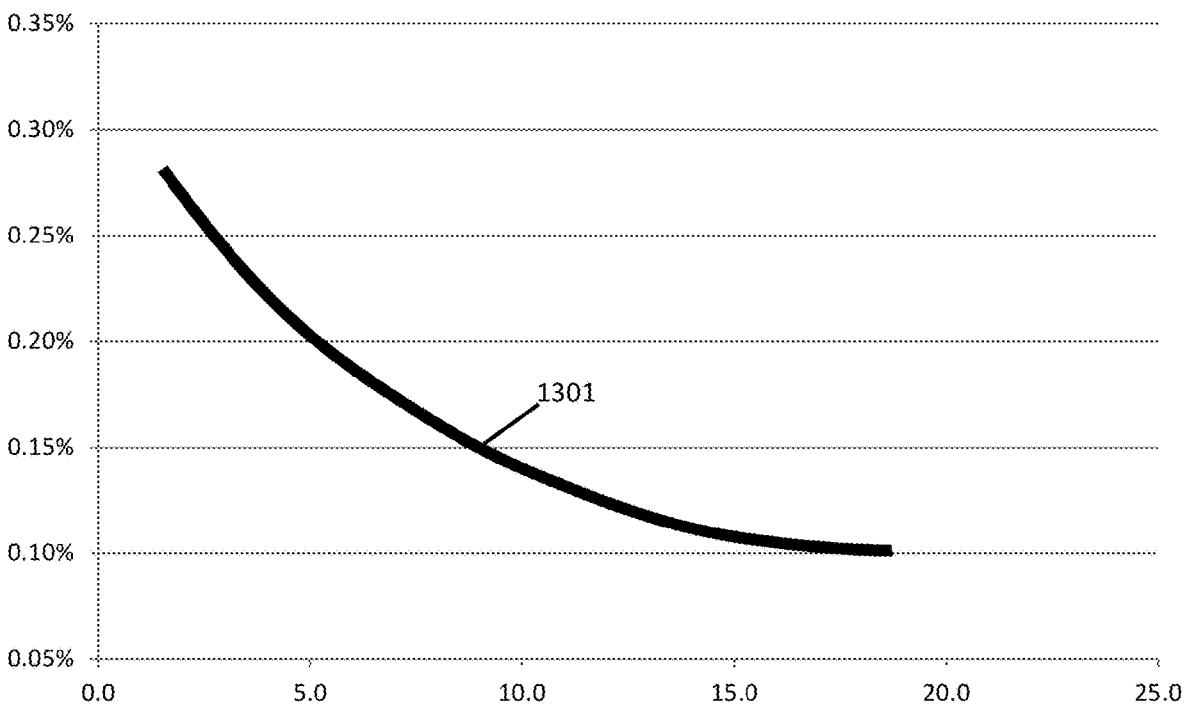
FIG. 13 is a schematic plot of inefficiency as a function of Sommerfeld number for a range of example gearboxes operating at maximum take-off conditions.

A higher PV value, resulting in a lower inefficiency value, will tend to increase the Sommerfeld number for a journal bearing. FIG. 13 illustrates a general relationship, given by trendline 1301, between inefficiency and Sommerfeld number for the above-mentioned range of gearboxes. The example star type gearboxes tend to have journal bearings with a lower Sommerfeld number, ranging between around 1 and 9 at maximum take-off conditions.

The two planetary gearboxes, with higher PV values, higher eccentricity and lower inefficiencies, have journal bearings that tend to have higher Sommerfeld numbers, ranging in general between around 4 and 21 under varying oil temperature and loadings. Under more optimal conditions of oil temperature, the Sommerfeld number for these planetary gearbox journal bearings tends to be between around 10 and 16. In a general aspect, the Sommerfeld number of each journal bearing may be greater than around 4, with an inefficiency of around 0.225% less under maximum take-off conditions. As mentioned above, the minimum inefficiency may be around 0.1%. The maximum Sommerfeld number may be around 21.

Figure 14:
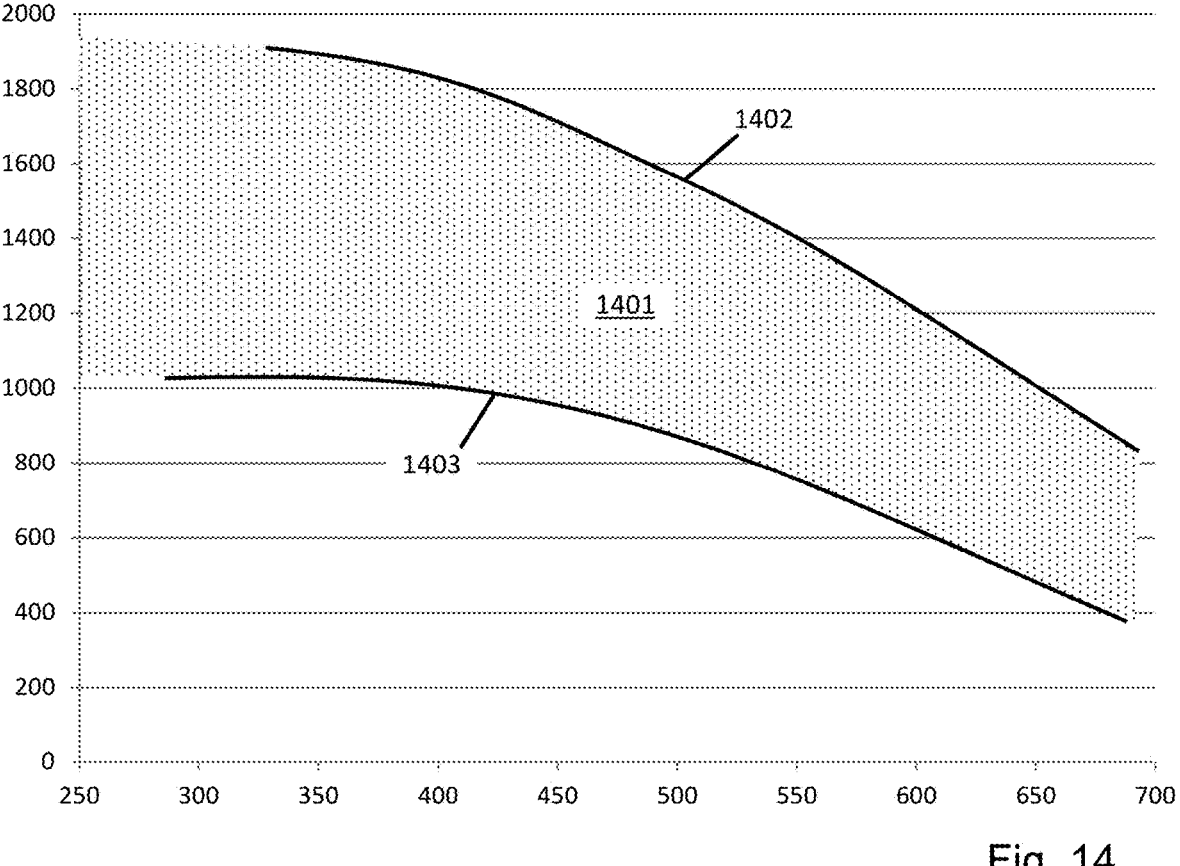
FIG. 14 is a schematic plot of specific oil flow as a function of PV for a range of example gearboxes operating at maximum take-off conditions.

FIG. 14 shows a schematic relationship between specific oil flow, i.e. oil flow (in litres/minute) divided by an area of the journal bearing (i.e. LD, in m²) as a function of PV (in MPa m/s). The region 1401 defined between upper and lower bounds 1402,1403 encompasses the journal bearing for each of the five above mentioned gearboxes, with the three star gearboxes at the left hand end of the region 1401, generally below around 450 MPa m/s and above 240 MPa m/s and the two planetary gearboxes at the right hand end, generally in a region between around 450 and 720 MPa m/s. The general relationship illustrates that a higher value for PV is associated with a lower specific oil flow, therefore requiring lower pressure oil flows and a general reduction in weight of associated equipment such as oil pumps and heatsinks for a given power rating. A higher PV value is therefore particularly advantageous for a gas turbine engine for an aircraft.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gearbox for an aircraft gas turbine engine, the gearbox comprising:
   a sun gear;
   a plurality of planet gears surrounding and engaged with the sun gear; and
   a ring gear surrounding and engaged with the plurality of planet gears, each of the plurality of planet gears being rotatably mounted around a pin of a planet gear carrier with a journal bearing having an internal sliding surface on the planet gear and an external sliding surface on the pin, wherein:
   the gearbox is of a planetary type, with the planet carrier arranged to be coupled to an output shaft, and ring gear being fixed; and
   during operation of the gas turbine engine at maximum take-off conditions, an operating specific load multiplied by an operating sliding speed of each journal bearing is in a range of between 450 MPa m/s and 720 MPa m/s.

2. The gearbox of claim 1, wherein, during operation of the gas turbine engine at maximum take-off conditions, the operating specific load multiplied by the operating sliding speed of each journal bearing is in a range of between 560 MPa m/s and 650 MPa m/s.

3. The gearbox of claim 1, wherein, during operation of the gas turbine engine at maximum take-off conditions, the sliding speed of each journal bearing is in a range of 35 m/s to 45 m/s.

4. The gearbox of claim 1, wherein, during operation of the gas turbine engine at maximum take-off conditions, the sliding speed of each journal bearing is in a range of 38 m/s to 42 m/s.

5. The gearbox of claim 1, wherein, during operation of the gas turbine engine at maximum take-off conditions, the operating specific load of each journal bearing is in a range from 10 MPa to 20 MPa.

6. The gearbox of claim 1, wherein a ratio of the length, L, of the internal and external sliding surfaces to the diameter, D, of each journal bearing is in the range 0.5 to 1.4.

7. The gearbox of claim 1, wherein a ratio of the length, L, of the internal and external sliding surfaces to the diameter, D, of each journal bearing is in the range 1.11 to 1.24.

8. The gearbox of claim 1, wherein:

each journal bearing comprises an oil flow path passing through the journal bearing from an inlet to an outlet; and during operation of the gas turbine engine at maximum take-off conditions, a specific oil flow rate through each oil flow path, defined as a flow rate of oil through the oil flow path divided by a diameter and length of the respective journal bearing is greater than 400 liter $min^{-1}$ $m^{-2}$ and less than 2000 liter $min^{-1}$ $m^{-2}$.

9. The gearbox of claim 1, wherein the gearbox has a gear ratio in a range of 3.2 to 4.5.

10. The gearbox of claim 1, wherein:

an inefficiency of each journal bearing, defined as a percentage power loss with the aircraft gas turbine engine operating at maximum take-off conditions, is in a range of 0.1% and 0.225%.

11. The gearbox of claim 1, wherein:

the internal or external sliding surface of the journal bearing has a surface coating comprising a first layer and a second layer, with the first layer being provided between an underlying journal bearing material and the second layer; and the first layer comprises a copper-based alloy and/or the second layer has a thickness of between 50% and 95% of a total thickness of the surface coating.

12. A gas turbine engine for an aircraft, comprising:

an engine core comprising a turbine, a compressor, and a core shaft connecting the turbine to the compressor;

a fan located upstream of the engine core, the fan comprising a plurality of fan blades; and a gearbox according to claim 1, the gearbox configured to receive an input from the core shaft and provide an output drive to the fan so as to drive the fan at a lower rotational speed than the core shaft, the output shaft being coupled to the planet carrier.

13. The gas turbine engine according to claim 12, wherein:

each fan blade has a hub and a tip, and a ratio of a radius of one of the fan blades at its hub to the radius of the fan blade at its tip is in a range of from 0.25 to 0.31;

each fan blade has a carbon-fibre based body with a titanium leading edge; and the gas turbine engine does not have a variable area nozzle.

14. The gas turbine engine according to claim 12 arranged such that at cruise conditions:

a bypass ratio is in a range of 11.5 to 15.5;

an overall pressure ratio is in a range of 45 to 60;

a specific thrust is in a range of 80 $Nkg^{-1}s$ to 100 N $kg^{-1}s$; and a temperature of the flow at the entry to the turbine is at least 1550 K.

15. A method of operating the gas turbine engine according to claim 12, the method comprising operating the gas turbine engine at maximum take-off conditions such that an operating specific load multiplied by an operating sliding speed of each journal bearing is in a range of 450 MPa m/s and 720 MPa m/s.

16. The method of operating the gas turbine engine according to claim 15, wherein the method further comprises operating the gas turbine engine at cruise conditions, and at cruise conditions the rotational speed of the fan is between 1700 rpm and 2500 rpm.

17. A gas turbine engine for an aircraft, comprising:

an engine core comprising a turbine, a compressor, and a core shaft connecting the turbine to the compressor;

a fan located upstream of the engine core, the fan comprising a plurality of fan blades; and a gearbox to receive an input from the core shaft and provide an output drive to the fan so as to drive the fan at a lower rotational speed than the core shaft, the gearbox comprising:

a sun gear that receives input from the core shaft;

a plurality of planet gears surrounding and engaged with the sun gear; and a ring gear surrounding and engaged with the plurality of planet gears, each of the plurality of planet gears being rotatably mounted around a pin of a planet gear carrier with a journal bearing having an internal sliding surface on the planet gear and an external sliding surface on the pin, wherein:

the gearbox is of a planetary type, with the planet carrier coupled to an output shaft to drive the fan, and the ring gear being fixed; and arranged such that the sliding speed of each journal bearing is in a range of 35 m/s to 45 m/s if the gas turbine engine is operated at maximum take-off conditions.

18. The gas turbine engine according to claim 17, wherein:

the internal or external sliding surface of the journal bearing has a surface coating comprising a first layer and a second layer, with the first layer being provided between the underlying journal bearing material and the second layer; and the first layer comprises a copper-based alloy.

19. A gas turbine engine for an aircraft, comprising:

an engine core comprising a turbine, a compressor, and a core shaft connecting the turbine to the compressor;

a fan located upstream of the engine core, the fan comprising a plurality of fan blades; and a gearbox to receive an input from the core shaft and provide an output drive to the fan so as to drive the fan at a lower rotational speed than the core shaft, the gearbox comprising:

a sun gear that receives input from the core shaft;

a plurality of planet gears surrounding and engaged with the sun gear; and a ring gear surrounding and engaged with the plurality of planet gears, each of the plurality of planet gears being rotatably mounted around a pin of a planet gear carrier with a journal bearing having an internal sliding surface on the planet gear and an external sliding surface on the pin, wherein:

the gearbox is of a planetary type, with the planet carrier coupled to an output shaft to drive the fan, and the ring gear being fixed; and arranged such that an operating specific load of each journal bearing is in a range of 10 MPa to 20 MPa if the gas turbine engine is operated at maximum take-off conditions.

20. The gas turbine engine according to claim 19, wherein:

the internal or external sliding surface of the journal bearing has a surface coating comprising a first layer and a second layer, with the first layer being provided between the underlying journal bearing material and the second layer; and the second layer has a thickness of between 50% and 95% of the total thickness of the surface coating.

\* \* \* \* \*